United States Patent
Matsuda et al.

(12)

(10) Patent No.: US 6,633,414 B1
(45) Date of Patent: Oct. 14, 2003

(54) APPARATUS HAVING A SCANNER (75) Inventors: Yasuhiro Matsuda, Kanazawa (JP);
Ryou Iwamoto, Kanazawa (JP);
Hiroyuki Yashima, Takaoka (JP);
Yoshiki Tsutiyama, Kanazawa (JP);
Yasuhiko Kitagawa, Ishikawa (JP);
Kazuya Yoshida, Kanazawa (JP);
Satoshi Ishida, Kanazawa (JP);
Yasuhiro Abe, Zama (JP); Akira Yamada, Kawasaki (JP); Makoto Mochizuki, Sagamihara (JP);
Yoshitomo Sasaki, Kawasaki (JP)

(73) Assignees: PFU Limited, Ishikawa (JP); Fujitsu Limited, Kawasaki (JP)

( * ) Notice: Subject to any disclaimer, the term of this patent is extended or adjusted under 35 U.S.C. 154(b) by 0 days.

(21) Appl. No.: 09/345,457

(22) Filed: Jun. 30, 1999

(30) Foreign Application Priority Data

Jun. 30, 1998 (JP) .......................... 10-184556

(51) Int. Cl.[7] .................................. H04N 1/04
(52) U.S. Cl. .................. 358/474; 358/496; 358/1.14
(58) Field of Search ................ 358/474, 496, 358/1.14

(56) References Cited

U.S. PATENT DOCUMENTS 6,064,498 A  * 5/2000  Taniguchi et al. ......... 271/3.03
6,205,363 B1 * 3/2001  Miyasaka et al. .............. 700/9
2002/0036807 A1 * 3/2002  Terashima et al. .......... 358/474

FOREIGN PATENT DOCUMENTS

| EP | 0 840 494 | 5/1998 |
|---|---|---|
| JP | 7-154517 | 6/1995 |
| JP | 10-39210 | 5/1998 |
| JP | 10-126541 | 5/1998 |
| JP | 10-134163 | 5/1998 |
| JP | 10-134169 | 5/1998 |

OTHER PUBLICATIONS

U.S. patent application Ser. No. 08/964,257, Kazushi et al., filed Nov. 4, 1997.

* cited by examiner

*Primary Examiner*—Edward Coles
*Assistant Examiner*—Houshang Safaipour (57) ABSTRACT

An apparatus has a printer unit, a scanner unit, a front cover that opens upward in the direction of the back surface and forms a transport path of scanner paper discharged by the scanner unit, and mounting members provided on the front cover for detachably mounting the scanner unit in such an attitude that the main scanning direction becomes horizontal. Furthermore, as the need arises, the apparatus may have a scanner paper tray member rotatably connected to the front cover at a location higher than the mounting members for feeding scanner paper to the scanner unit.

36 Claims, 10 Drawing Sheets

APPARATUS HAVING A SCANNER

BACKGROUND OF THE INVENTION

The present invention relates generally to an apparatus having a scanner, and more particularly to an apparatus having a printer and a scanner that achieves improved maintainability.

In recent years, image processing has been rapidly increasing its share in the field of personal computer-based data processing. Along with this trend, the use of scanners for capturing images has also become widespread. A personal computer system, however, usually comprises a number of components, such as a personal computer, display, keyboard, printer, etc., occupying a considerable space. When introducing a new scanner, therefore, average computer users often feel difficulty in finding a space for it. Furthermore, buying a new scanner is still a heavy financial burden for ordinary computer users, though they have recently become available at affordable prices. It is against this background that combined scanner/printer units, in which a scanner is installed on the printer carriage and the paper feeding mechanism of the printer is used to feed an image manuscript, have become popular.

In the conventional type of combined scanner/printer unit, however, the paper feeding mechanism is commonly used for both the printer and the scanner, making it impossible to simultaneously carry out both printing and scanning function in parallel. Some products have a detachable reading unit that can be used as a handheld scanner by detaching it from the main unit. Such handheld scanners, however, can be operated only manually because they have no drive mechanism.

Whereas a dedicated drive mechanism is required for a handheld scanner to be automatically running (self-propelled), such a drive mechanism could become redundant when the scanner is used on the printer unit, posing a problem in terms of cost performance.

Figure 10:
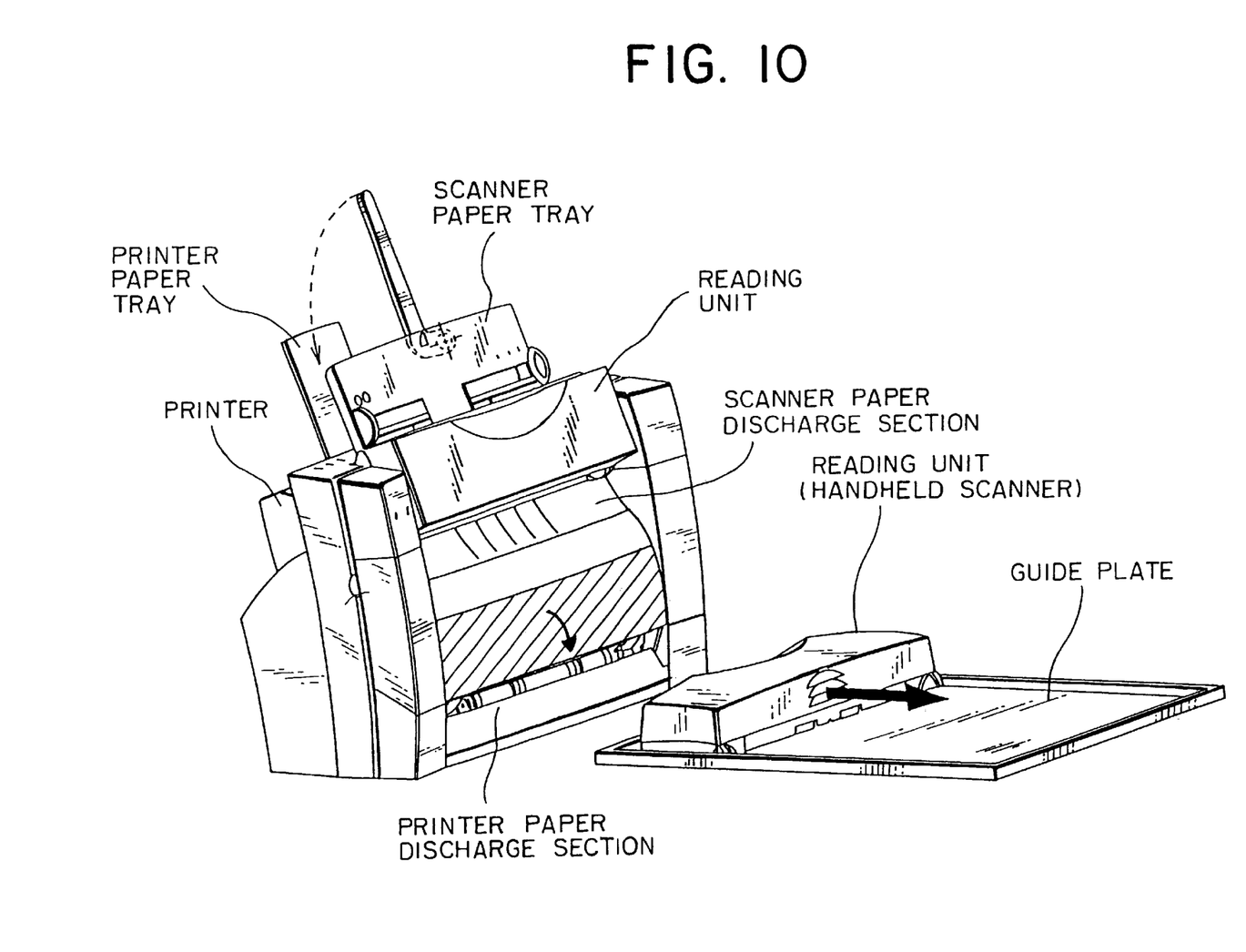
FIG. 10 is a diagram of assistance in explaining an invention applied earlier by the present applicant.

In view of this, we disclosed in Japanese patent application laid-open No. Hei-10(1998)-139210 (Japanese patent application Serial No. Hei-8(1996)-292829) an invention of an apparatus as shown in FIG. 10 in which a self-propelled scanner is detachably mounted on a printer, a paper transporting path for scanner paper is formed at the interface between the printer and the scanner, and a travelling mechanism for the automatically running type scanner is used as a paper feeding mechanism.

In the apparatus disclosed in the above application spesification, a automatically running type scanner is detachably mounted on a normally closed type printer cover, the lower part (the shaded part in FIG. 10) of which can be opened for printer maintenance (including replacement of ink cartridges) by swinging downward.

With this construction, there is no problem when a part being repaired or replaced is small in size, or the apparatus is of a large size. However, maintenance might become difficult when a part to be repaired or replaced is of a large size, or when the entire apparatus has to be designed as a small unit. That is, since the automatically running type scanner is mounted on the upper part of the front cover, the size of the space for maintenance provided by swinging the lower part of the cover downward is limited, making maintenance work difficult. In addition, swinging the lower part of the front cover downward involves an additional space in front of the unit.

SUMMARY OF THE INVENTION

The present invention is made to cope with these circumstances, and an object of the present invention is to provide an apparatus having a scanner that can achieve improved maintainability.

Another object of the present invention is to provide an apparatus having a printer and a scanner that can achieve improved maintainability.

To accomplish this object, the present invention provides an apparatus comprises a base unit, a scanner unit which can removably mounted on the base unit, a front cover that is swung open upward, and a mounting member provided on the front cover for detachably installing the scanner unit. In addition, a medium feed tray (or chute) member rotatably connected to the front cover at a location above the mounting member for feeding medium to the scanner unit may be provided as the need arises.

In the apparatus of the present invention, where a front cover on which a scanner unit is mounted is swung open upward, a wide opening is provided, improving maintainability and reducing the space required in front of the unit.

In the apparatus of the present invention of the aforementioned basic construction, the medium feed tray member for feeding medium is rotatably connected to the front cover. With this arrangement, if the medium feed tray member interferes with the medium transporting path of the printer unit when an attempt is made to open the front cover upward, the medium tray member is rotated toward the front cover to allow the front cover to fully open upward.

To allow the medium tray member to return to the original position without user's efforts, the apparatus of the present invention adopts an arrangement where as the front cover is closed, the medium tray member is automatically returned to the normal position in accordance with positional relationship between the rotation fulcrum and the gravitational center of the medium tray member.

In the apparatus of the present invention, the possibility of the user accidentally letting his hold of the front cover as he attempts to push it up by hand is prevented by providing on the rear surface of the front cover a protruding member that is inserted between members of the base unit to limit the opening and closing of the front cover.

At this time, excessive stress is prevented to be exerted onto the members of the base unit by preventing the protruding member from being inserted between the unit members as the front cover is returned to the normal position.

In addition, taking into consideration a possible accident of the user letting his hold of the front cover as he attempts to push it up by hand is prevented, the front cover is adapted to automatically open upward owing to the properly balanced positional relationship between the rotation fulcrum and the gravitational center of the front cover.

Moreover, in order to stop the printing operation of the printer unit when the front cover is opened, the apparatus of the prevent invention may have sensor unit for detecting the opening and closing of the front cover, and printing control mechanism for controlling the printer unit to stop printing operation if the sensor unit detects that the front cover is being opened (whether this control processing is to be executed or not may be determined, depending on the mode set in the printing control mechanism).

Further, in order to prevent the printer unit from starting the printing operation when the front cover is opened, the apparatus of the prevent invention may have sensor unit for detecting the opening and closing of the front cover, and printing control mechanism for controlling the printer unit to prevent from starting the printing operation if the sensor unit detects that the front cover is being opened (whether this control processing is to be executed or not may be determined, depending on the mode set in the printing control mechanism).

In addition, in order to prevent the front cover from being opened during the printing operation of the printer unit, the apparatus of the present invention may have means for preventing the front cover from being opened, and printing control mechanism for controlling the terminal apparatus so that the front cover is prevented from being opened (whether this control processing is to be executed or not may be determined, depending on the mode set in the printing control mechanism).

DETAILED DESCRIPTION OF THE PREFERRED EMBODIMENTS

In the following, the present invention will be described in accordance with the preferred embodiments thereof.

Figure 1:
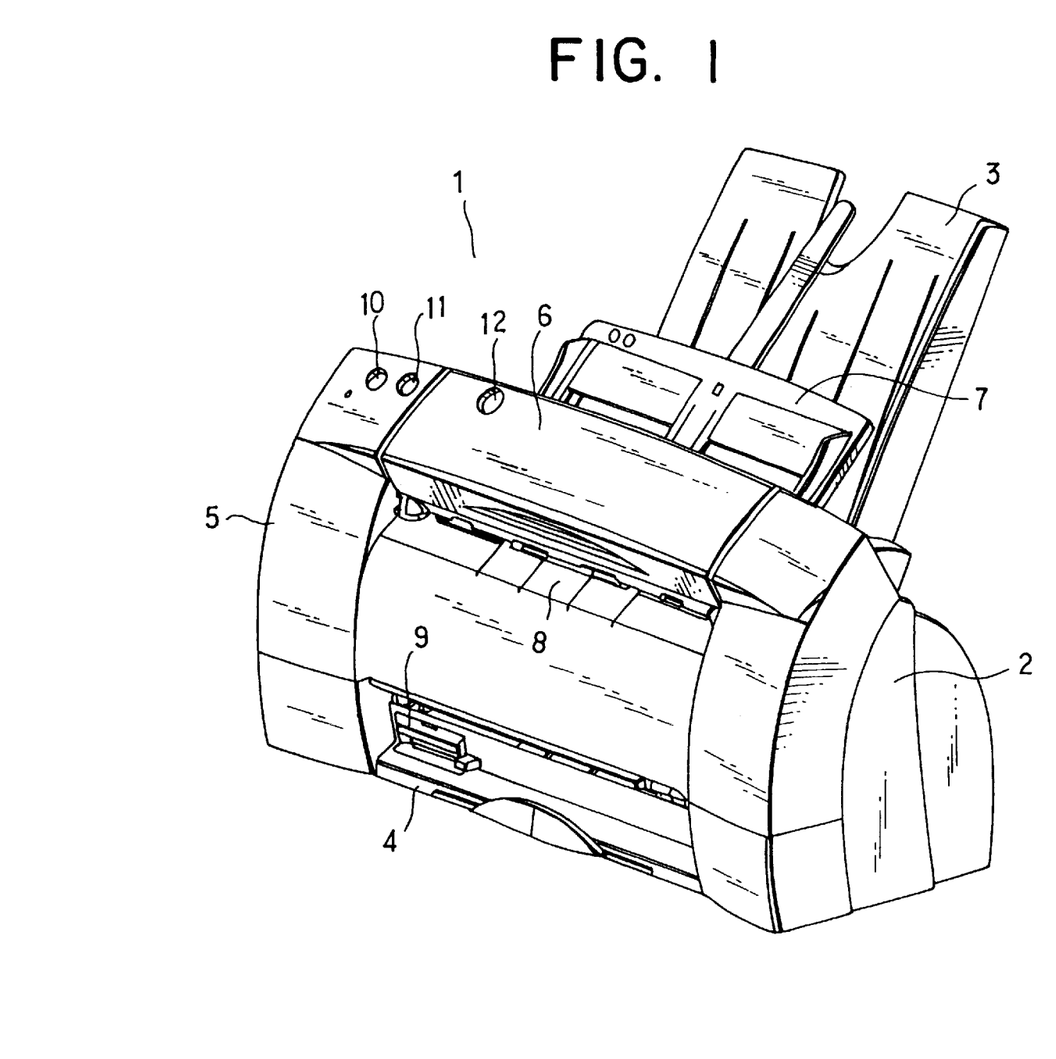
FIG. 1 is a diagram illustrating the overall construction of the present invention.

FIG. 1 shows the overall construction of an apparatus embodying the present invention. As shown in FIG. 1, the apparatus 1 of the present invention comprises a base unit and a scanner unit which can be removably mounted on the base unit. The base unit has a printer unit 2. The unitbody of the printer unit 2 is constituted the base unit. The printer unit and scanner unit has a printer medium (paper) tray 3 and scanner medium (paper) tray 7, respectively, both are extended substantially vertical and feed medium such as paper.

The apparatus 1 of the present invention comprises a printer unit 2 for printing on printer paper fed from a printer paper tray (or printer chute) 3 and discharging printed paper to a printed medium (paper) discharge section 4, a automatically running type scanner unit 6 detachably fitted to a round-surfaced base cover (or front cover) 5 of the printer unit 2 in such a position that the main scanning direction becomes horizontal for reading an image recorded on scanner paper fed from a scanner paper tray (or scanner chute) 7 to discharge a scanner medium (paper) discharge section 8, and a memory card slot 9 for receiving a memory card in which image data read by a digital camera (not shown), etc.

A retractable printed paper discharge tray is housed on the printer paper discharge section 4. A copy start button 10 in FIG. 1 is provided to give a scanning instruction for scanner unit 6 and a printing instruction of image data scanned by the scanner unit 6 to a personal computer (not shown). A facsimile (FAX) start button 11 to give a facsimile transmission instruction to the personal computer to facsimile transmit image data read by the scanner unit 6 or stored in a memory card (not shown) inserted into the memory card slot 9. A scan start button 12 to give a scanner unit read instruction to the personal computer. The apparatus 1 is a image processing apparatus or terminal apparatus having CPU (Central Processing Unit) and processing image data as described above and as shown in FIG. 9. That is, the apparatus 1 is a composite terminal apparatus.

Separate paper transporting paths 3 and 7 are provided for the printer unit 2 and the scanner unit 6 because the use of a common paper transporting path could involve complicated paper changeover, leading to paper feeding mistakes, since blank printer paper is usually kept placed on the printer paper tray 3 on the printer unit 2, while various types of manuscripts being read (scanner paper) are charged on the scanner paper tray 7 in the scanner unit 6 as the need arises.

Figure 2:
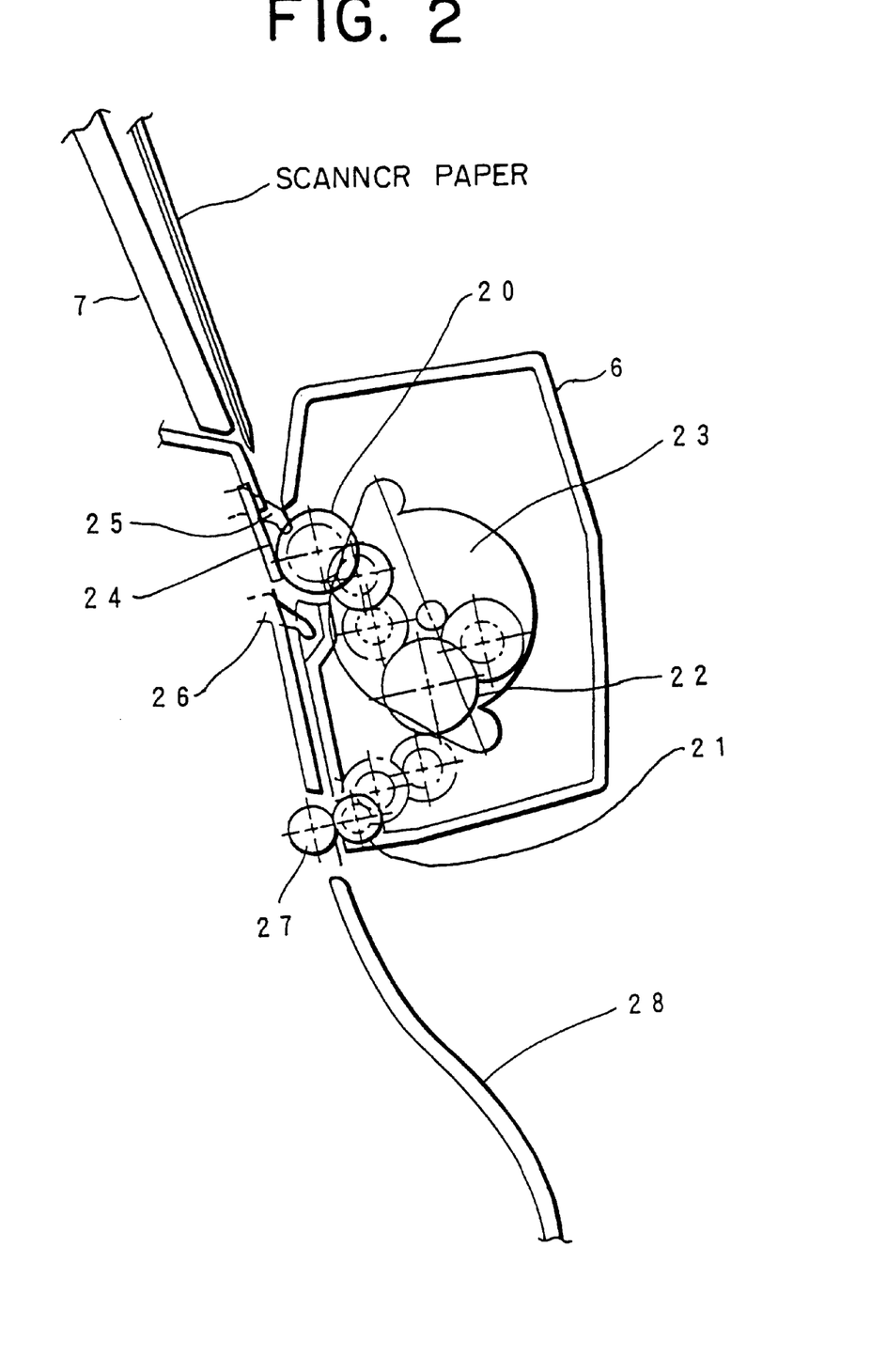
FIG. 2 is a cross-sectional view of a scanner unit.

FIG. 2 is a cross-sectional view of the automatically running type scanner unit 6 mounted on the base cover 5. A paper transporting path for the scanner unit 6 mounted on the base cover 5 is accomplished by a gap between the base cover 5 and the scanner unit 6 mounted thereon. On the scanner unit 6 provided are a pick roller 20 and a feed roller 21, each driven by a drive motor 23 via a drive gear train 22, as shown in FIG. 2.

When a pile of scanner paper is placed on the scanner paper tray 7, scanner paper is separated sheet by sheet and extracted downward by the pick roller 20 and a paper separating member 24. The extracted scanner paper is then detected by a paper detecting sensor 25 to prepare for reading. As the paper leading and trailing edge sensor 26 detects the leading edge of the scanner paper, the reading of images is started, and then completed when the sensor 26 detects the trailing edge of the scanner paper. The feed roller 21 and the follower roller 27 discharge the read scanner paper to the scanner paper discharge section 8 using a scanner paper guide 28 provided on the base cover 5.

Figure 3:
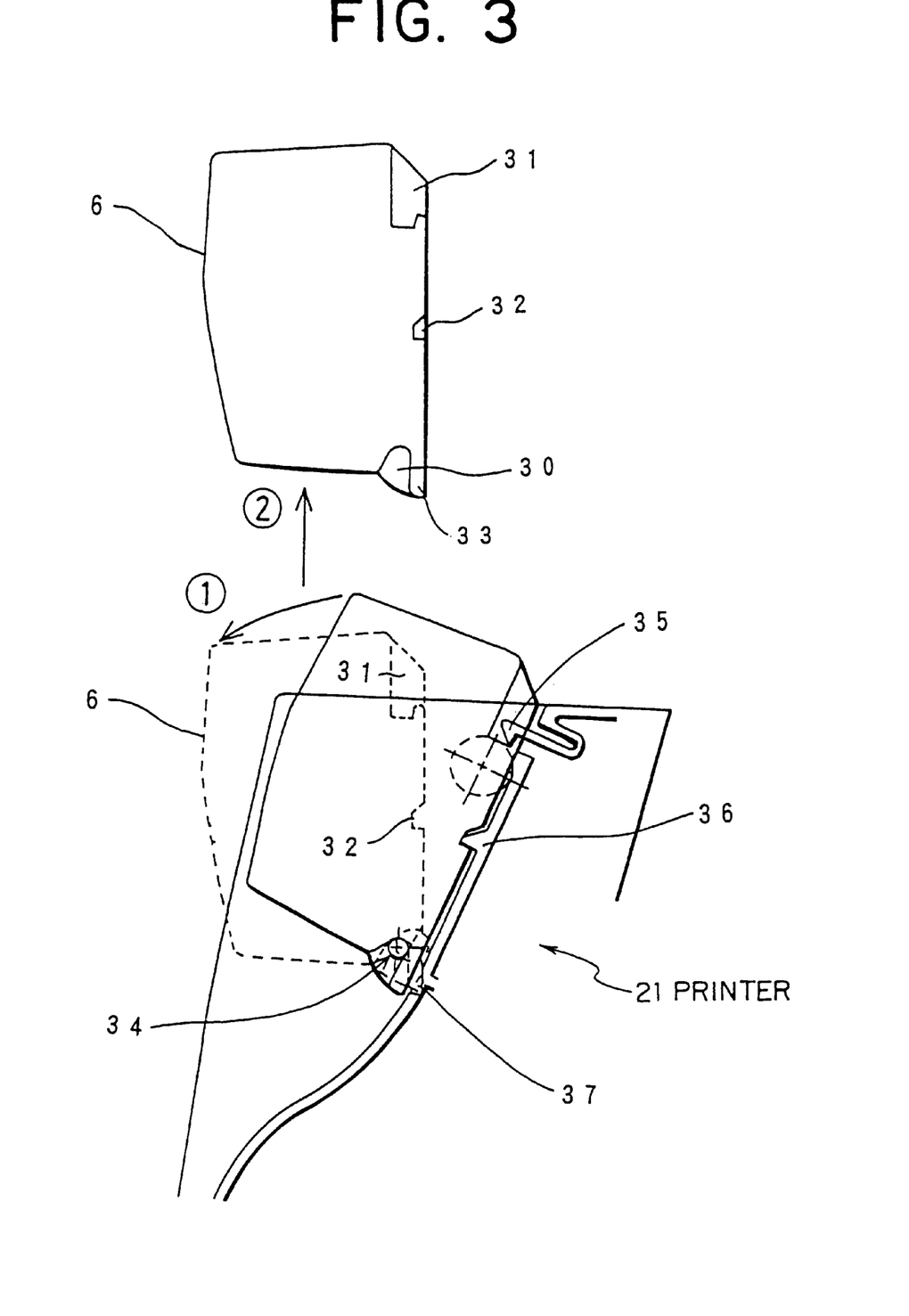
FIG. 3 is a diagram of assistance in explaining the attaching and detaching mechanism of the scanner unit.

The automatically running type scanner unit 6 is mounted on the base cover 5 in accordance with the construction shown in FIG. 3.

That is, fulcrum projection grooves 30, locking pawl grooves 31, shift stopper grooves 32, and rotation stoppers 33 are provided on both ends of the scanner unit 6 so as to ensure that the scanner unit 6 is detachably but positively engaged and held by the printer unit 2. On the printer unit 2 provided are fulcrum projections 34, locking pawls 35, shift stoppers 36, and rotation stopper grooves 37 to engage with the above-mentioned members. The fulcrum projections (or pivotal shafts) 34 are for allowing the scanner unit 6 to rotate. The fulcrum projection grooves (or recesses) 30 are for receiving and holding the fulcrum projections 34. The locking pawls 35, shift stoppers 36 and rotation stoppers 33 are for holding and fixing the scanner unit 6. The locking pawl grooves 31, shift stopper grooves 32 and rotation stopper grooves 37 are for receiving and holding the locking pawls 35, shift stoppers 36 and rotation stoppers 33, respectively. The fulcrum projection grooves 30, locking pawl grooves 31, shift stopper grooves 32 and/or rotation stoppers 33 may be provided on the printer unit 2, and fulcrum projections 34, locking pawls 35, shift stoppers 36 and/or rotation stopper grooves 37 may be provided on the scanner unit 6.

The fulcrum projection grooves 30 are opened downward so that the scanner unit 6 can be turned upright, as shown by dotted lines, from the position at which the scanner unit 6 is mounted on the printer unit 2 in a rightward tilted state, as shown by solid lines, by rotating the scanner unit 6 leftward as shown by an arrow ①, and removed from the printer unit 2 by lifting upward as shown by an arrow ②. The scanner unit 6 can be mounted on the printer unit 2 by reversing the steps ① and ② above.

When mounted on the printer unit 2, the scanner unit 6 is prevented from being moved leftward unless a certain force is exerted because the locking pawl grooves 31 are engaged with the locking pawls 35. The engagement of the shift stopper grooves 32 with the shift stoppers 36 prevents the scanner unit 6 mounted on the printer unit 2 from being moved upward, enabling the scanner unit 6 to be mounted on the printer more positively, together with the engagement of the lock pawl grooves 31 with the lock pawls 35.

Furthermore, the rotation stoppers 33 formed in such a manner as to protrude downward integrally with the fulcrum projection grooves 30 make contact with the rotation stopper grooves 37 provided on the side of the printer unit 2, when the scanner unit 6 is rotated leftward, limiting the rotation of the scanner unit 6 within a predetermined angle, thereby preventing the scanner unit 6 from falling off due to an inadvertent operation.

Figure 4:
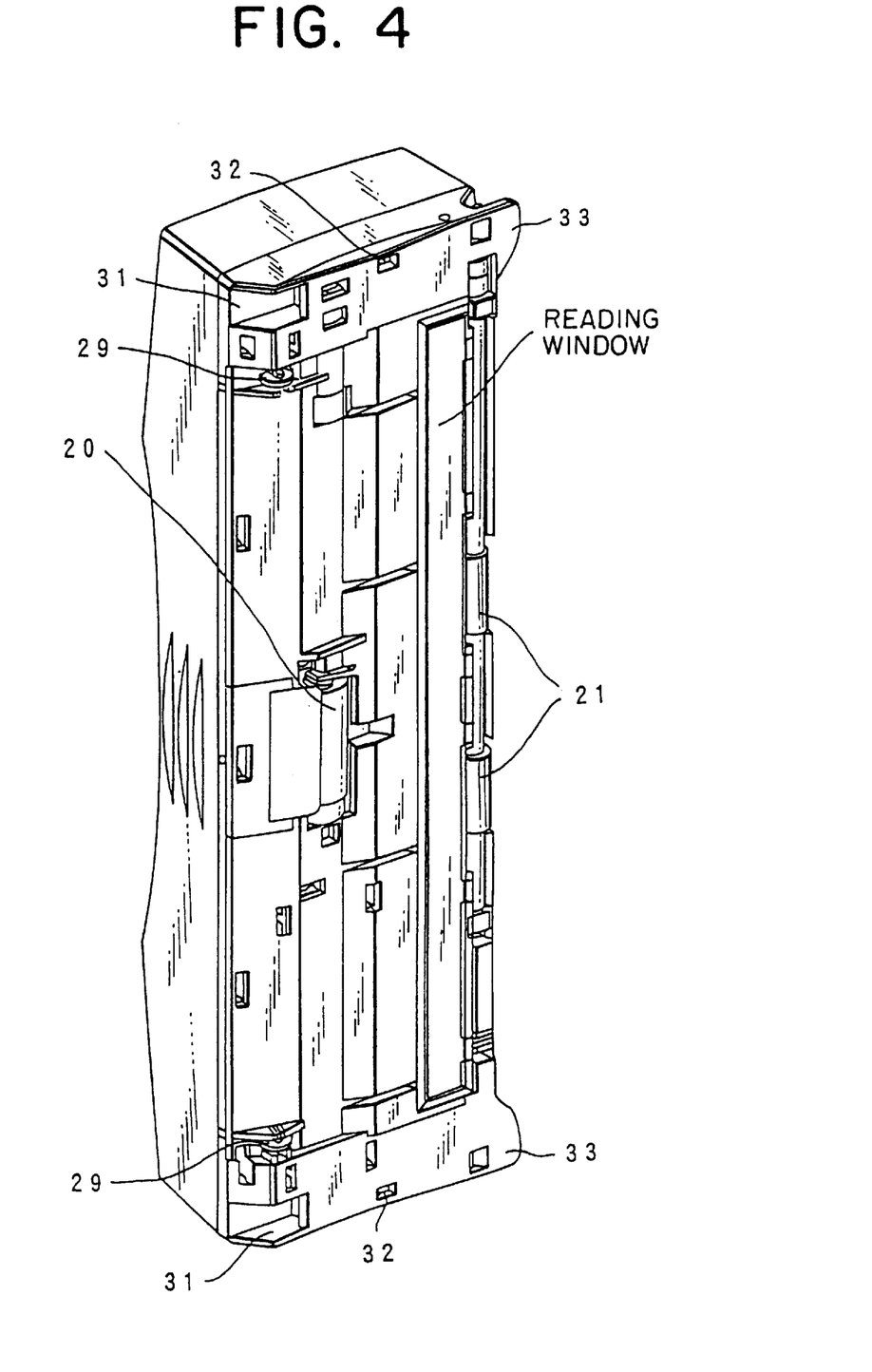
FIG. 4 is an external view of the scanner unit.

The external appearance of the automatically running type scanner unit 6 having the aforementioned construction is as shown in FIG. 4.

That is, a pick roller 20 is provided on the fore central part of the bottom surface of the scanner unit 6, and a pair of feed rollers 21 are provided at the symmetrical lateral locations at the rear central part of a reading window (through which the light reflected from the scanner paper is received and converted into electrical signals by a CCD).

Since the pick roller 20 and the feed rollers 21 are driven by the drive motor 23 via the drive gear train 22, as described above, their rotation can be used to cause the scanner unit 6, when used as a handheld scanner, to travel by itself. The pick roller 20, which is made of a relatively flexible material, could withdraw into the scanner body due to the weight of the scanner unit 6. Auxiliary wheels 29 are provided to avoid this by supporting the scanner unit 6 during travelling to prevent the pick roller 20 from coming in too close contact with the surface of the manuscript. These auxiliary wheels 29 are provided outside the scanning area to prevent the manuscript surface from being damaged.

Figure 5:
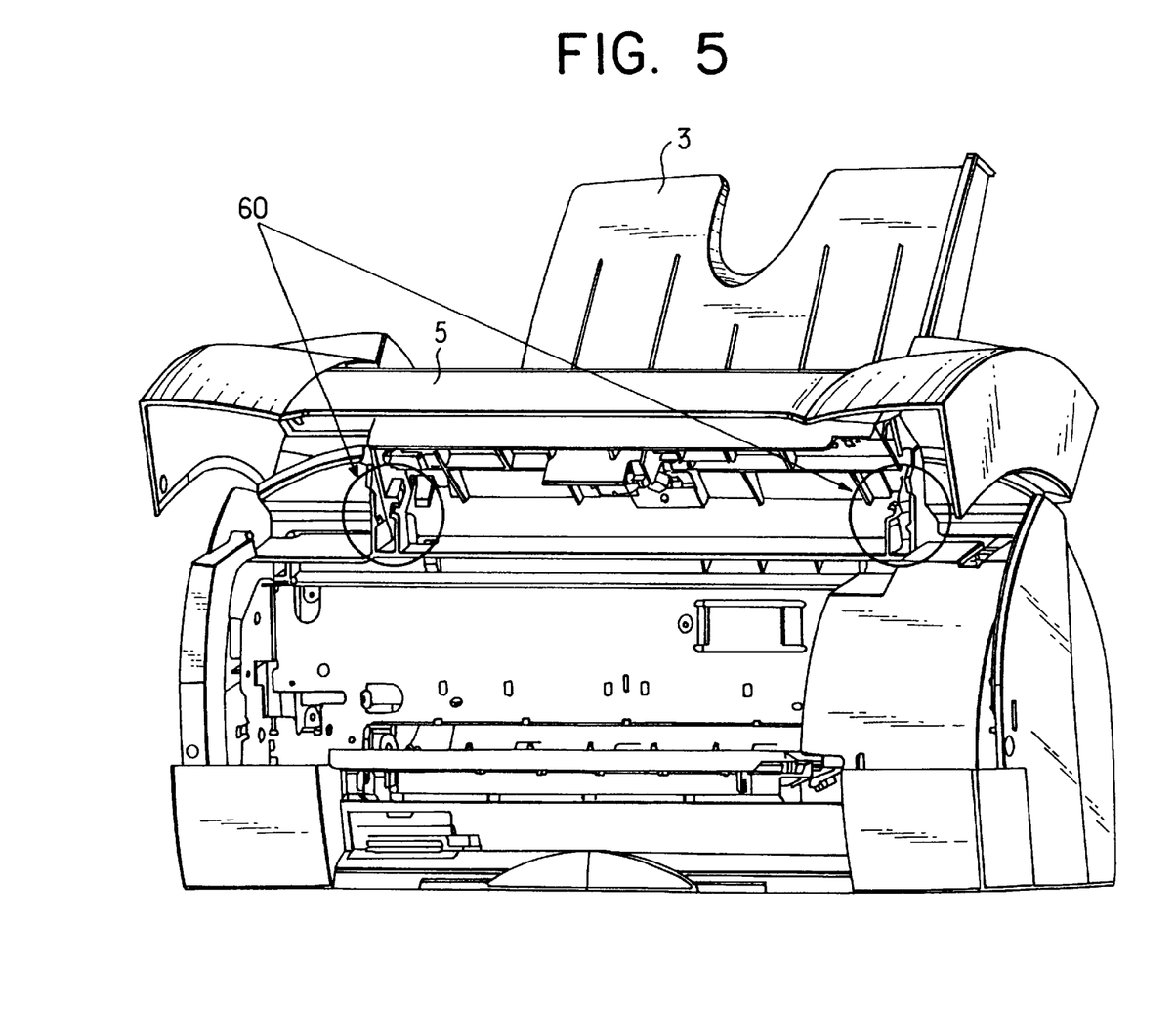
FIG. 5 is a diagram of assistance in explaining the prevent invention.

The base cover 5 of the printer unit 2 on which the automatically running type scanner unit 6 is mounted is adapted to be opened upward toward the backward direction of the printer unit 2, as shown in FIG. 5. By adopting the opening/closing construction, the inside of the printer unit 2 can be opened wide, facilitating the replacement of ink cartridges and other maintenance operations, contributing to improved maintainability.

Figure 6:
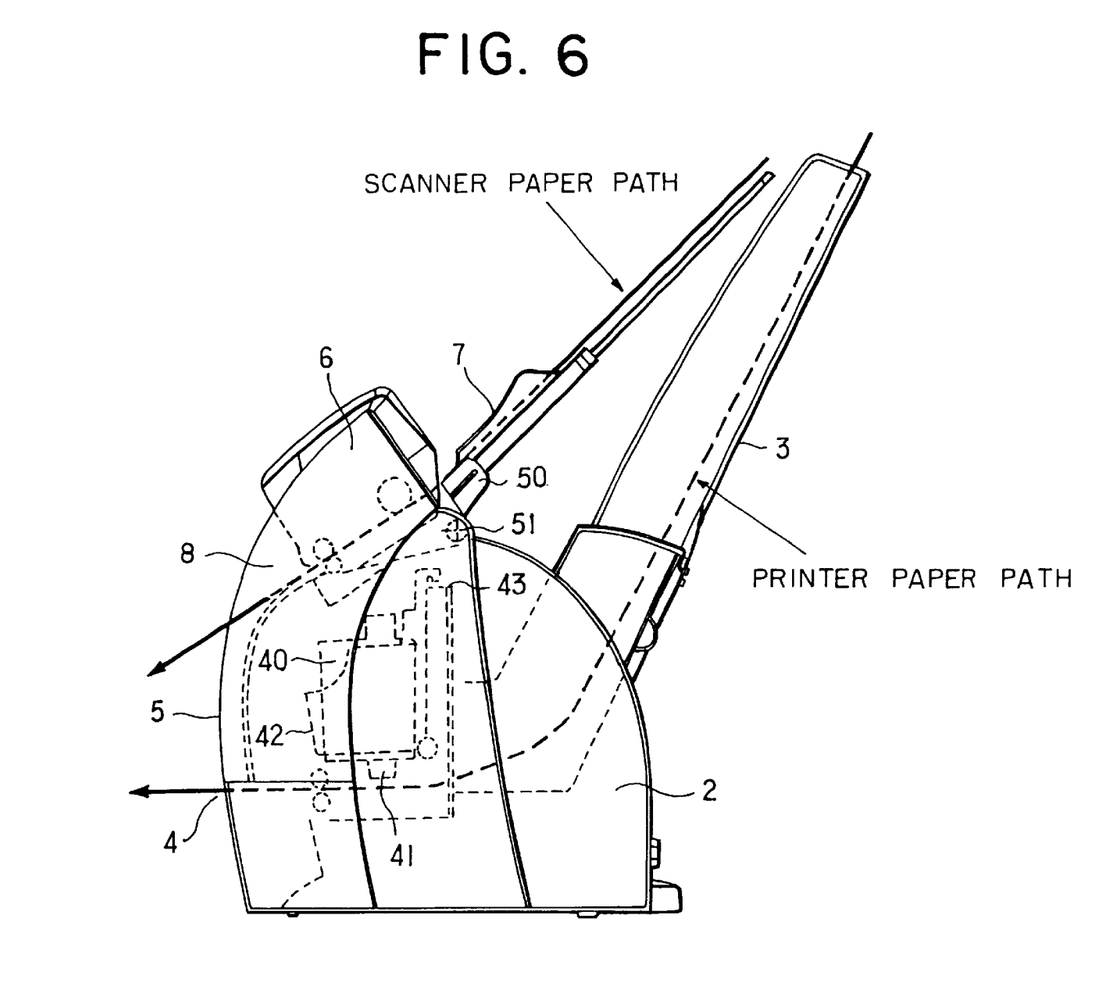
FIG. 6 is a diagram of assistance in explaining the prevent invention.
Figure 7:
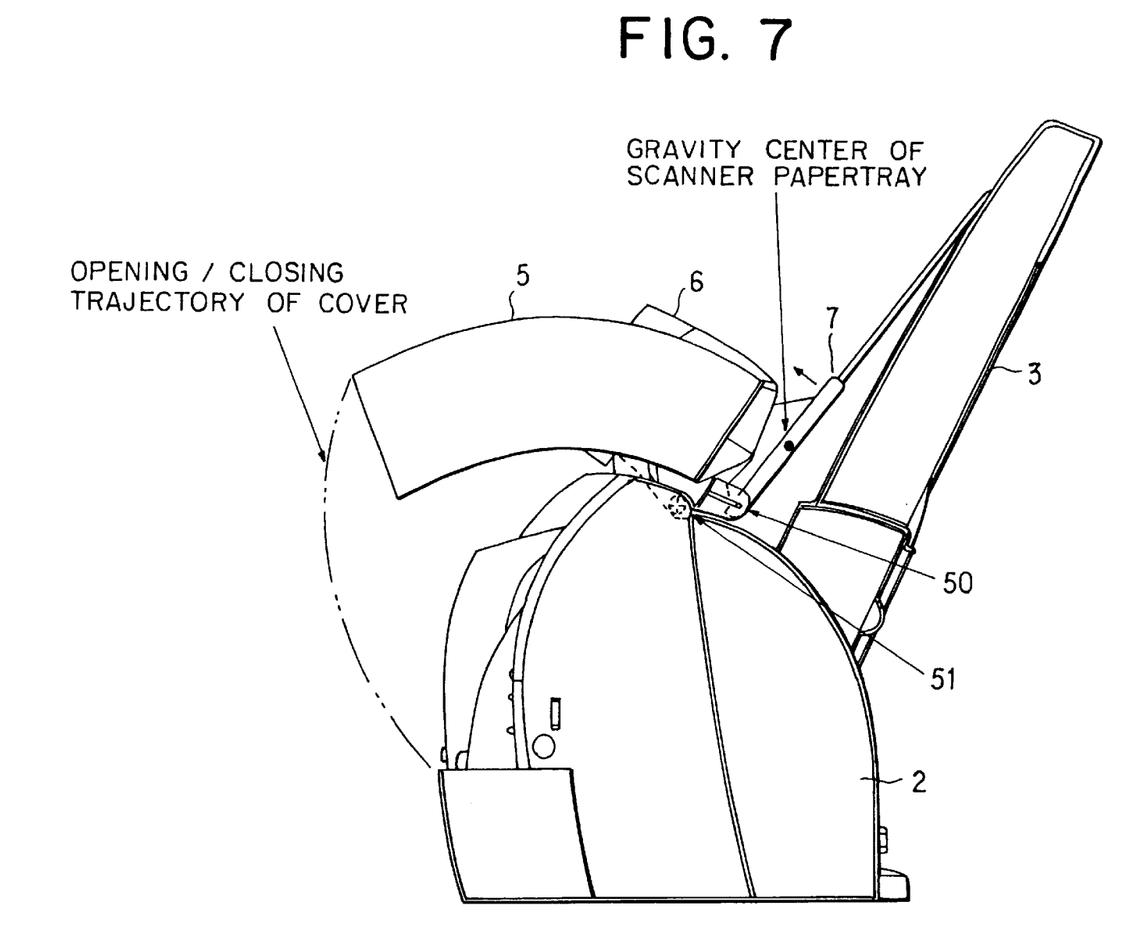
FIG. 7 is a diagram of assistance in explaining the prevent invention.

FIG. 6 is a side view of the composite terminal apparatus 1 of the present invention in the state where the base cover 5 is closed. FIG. 7 is a side view of the composite terminal apparatus 1 of the present invention in the state where the base cover 5 is opened. In FIG. 6, numeral 40 refers to an ink cartridge having an ink-jet type printer head 41, 42 to a carriage for moving the ink cartridge 40 in the printing direction (in the direction orthogonally intersecting with the flow of printer paper), 43 to a rail for guiding the movement of the carriage 42.

As shown in FIGS. 6 and 7, the scanner paper tray 7 for feeding scanner paper to the scanner unit 6 is rotatably connected to the base cover 5 at a location higher than the location at which the scanner unit 6 is mounted by engaging with the rotation fulcrum 50, which is provided on the base cover 5, for the scanner paper tray 7. The rotation fulcrum 50 is constituted by a pivotal shaft and a groove or recess for receiving and holding the pivotal shaft. The pivotal shaft may be arranged on either one of the scanner paper tray 7 and the base cover 5, and the groove on the other one.

The base cover 5 for detachably mounting the automatically running type scanner unit 6 is mounted on the printer body of the printer unit 2 or base unit in such a manner that the base cover 5 can be opened upward in the backward direction of the terminal apparatus 1 by engaging with the rotation fulcrum 51 which is provided on the unit body of the printer unit 2 (or base unit). The rotation fulcrum 51 is constituted by a pivotal shaft and a groove or recess for receiving and holding the pivotal shaft. The pivotal shaft may be arranged on either one of the base cover 5 and the unit body of the printer unit 2, and the groove on the other one.

When the base cover 5 is closed, the scanner paper tray 7 is at rest on stoppers (not shown) in a position tilted at a smaller angle than the tilting angle of the printer paper tray 3, as shown in FIG. 6. This allows scanner paper to be fed smoothly to the scanner unit 6.

When the base cover 5 is opened, on the other hand, part of the base cover 5 hits against the printer paper tray 3 located behind. Then, the scanner paper tray 7 is rotated forward around the rotation fulcrum 50 for the scanner paper tray 7, as shown in FIG. 7, thereby allowing the base cover 5 to be opened.

With this construction, the scanner paper tray rotation fulcrum 50 is disposed in such a manner that the gravity center of the scanner paper tray 7 is situated at all times on the rear surface side with respect to the vertical line (the direction of gravity force) passing on the scanner paper tray rotation fulcrum 50. This allows the scanner paper tray 7 to be rotated backward so as to be automatically returned to the original attitude when the opened base cover 5 is closed again.

In the case that the positional relationship between the location of the gravity center of the scanner paper tray 7 and the location of the scanner paper tray rotation fulcrum 50 can be applied to the positional relationship between the location of the gravity center of the base cover 5 and the location of the printer rotation fulcrum 51, operability can be improved since the base cover 5 is prevented from moving in the closing direction, when the base cover 5 is opened.

That is, in the case that the printer rotation fulcrum 51 can be disposed in such a location that the gravity center of the base cover 5 is located at all times on the rear surface side with respect to the vertical line passing on the printer rotation fulcrum 51, operability can be improved since the base cover 5 is prevented from moving in the closing direction when the base cover 5 is opened.

In case that this positional relationship cannot be realized, a locking mechanism 60 for preventing the base cover 5 from moving in the closing direction when the base cover 5 is opened should preferably be provided, as shown in FIG. 5.

Figure 8:
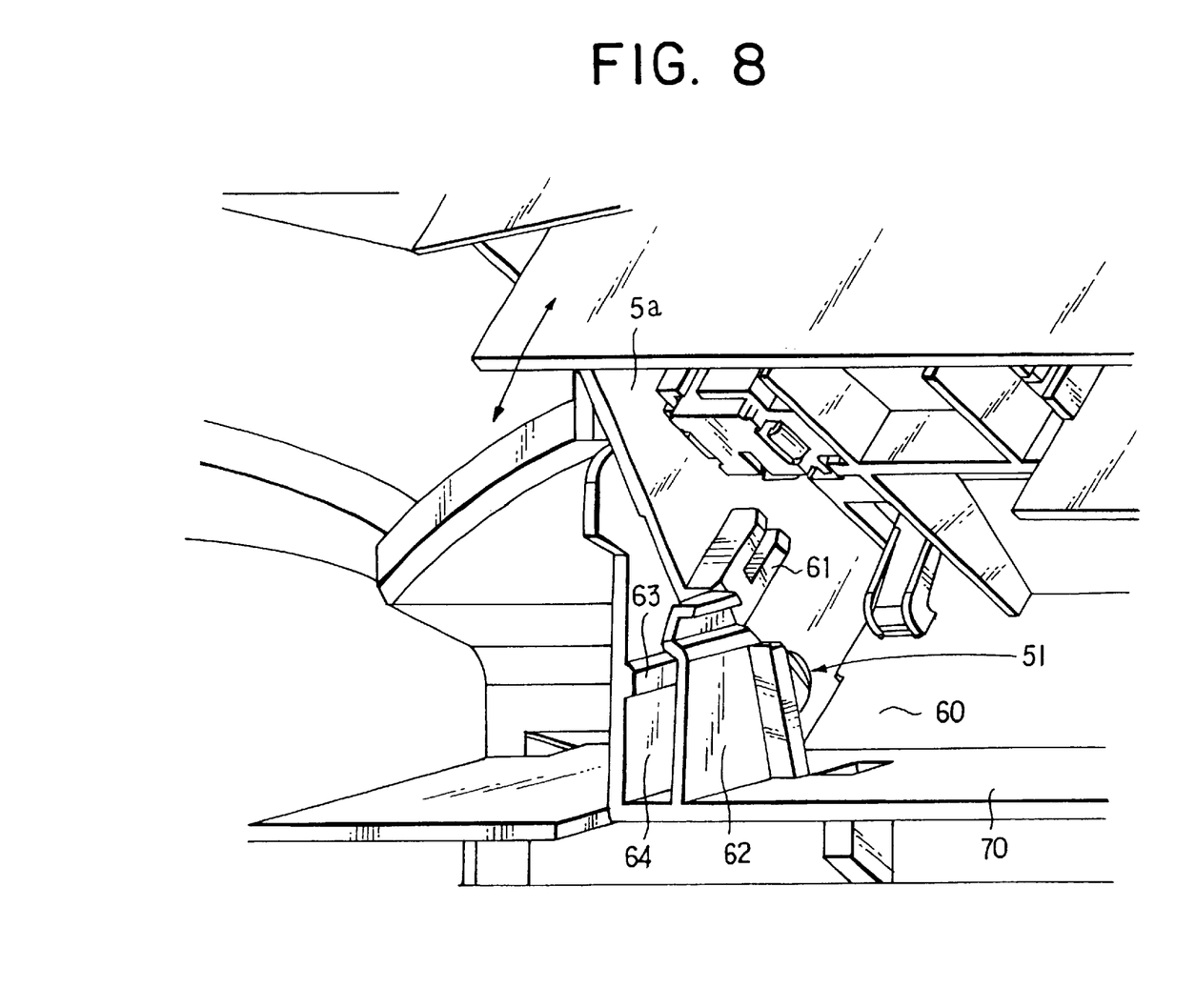
FIG. 8 is a diagram of assistance in explaining a locking mechanism.

FIG. 8 shows an embodiment of the locking mechanism 60. The possibility of the user accidentally letting his hold of the base cover 5 as he attempts to push it up by hand is prevented by providing on the rear surface of the base cover 5 a protruding member that is inserted between members of the base unit to limit the opening and closing of the base cover 5. At this time, excessive stress is prevented to be exerted onto the terminal apparatus members by preventing the protruding member from being inserted between the members of the base unit as the base cover 5 is returned to the normal position.

The locking mechanism 60 of this embodiment comprises a protruded member 61 provided on the internal wall 5a of the base cover 5, and a holding member 62 and pushing member 63, both provided on the internal wall 70 of the body of the printer unit 2 (or the base unit). The protruded member 61, the holding member 62 and the pushing member 63 are manufactured from molded products.

A gap formed between the holding member 62 and the pushing member 63 is defined to be slightly smaller than the thickness defined by the thickness of the internal wall 5a and the protruded height of the protruded member 61. This allows the base cover 5 to be in a standstill position due to the force generated by the holding member 62 when the protruded member 61 is inserted into the gap. Consequently, operability can be improved since the base cover 5 is prevented from moving in the closing direction when the base cover 5 is opened.

To facilitate the insertion of the protruded member 61, a taper is formed on the protruded member 61. In order to prevent a force from unwantedly exerting on the holding member 62 in the state where the base cover 5 is closed, the protruded member 61 is adapted to fit in a space 64 formed by the holding member 62. By fitting the protruded member 61 in the space 64, the base cover 5 can be prevented from opening spontaneously.

In the composite terminal apparatus 1 of the present invention, where the base cover 5 is opened to maintain the printer unit 2, a sensor for detecting the opening and closing of the base cover 5 is provided to effect control so that the printing operation of the printer unit 2 is stopped when the sensor detects that the base cover 5 is opened, and that the printer unit 2 is prevented from starting printing so long as the sensor detects that the base cover 5 is kept open.

Figure 9:
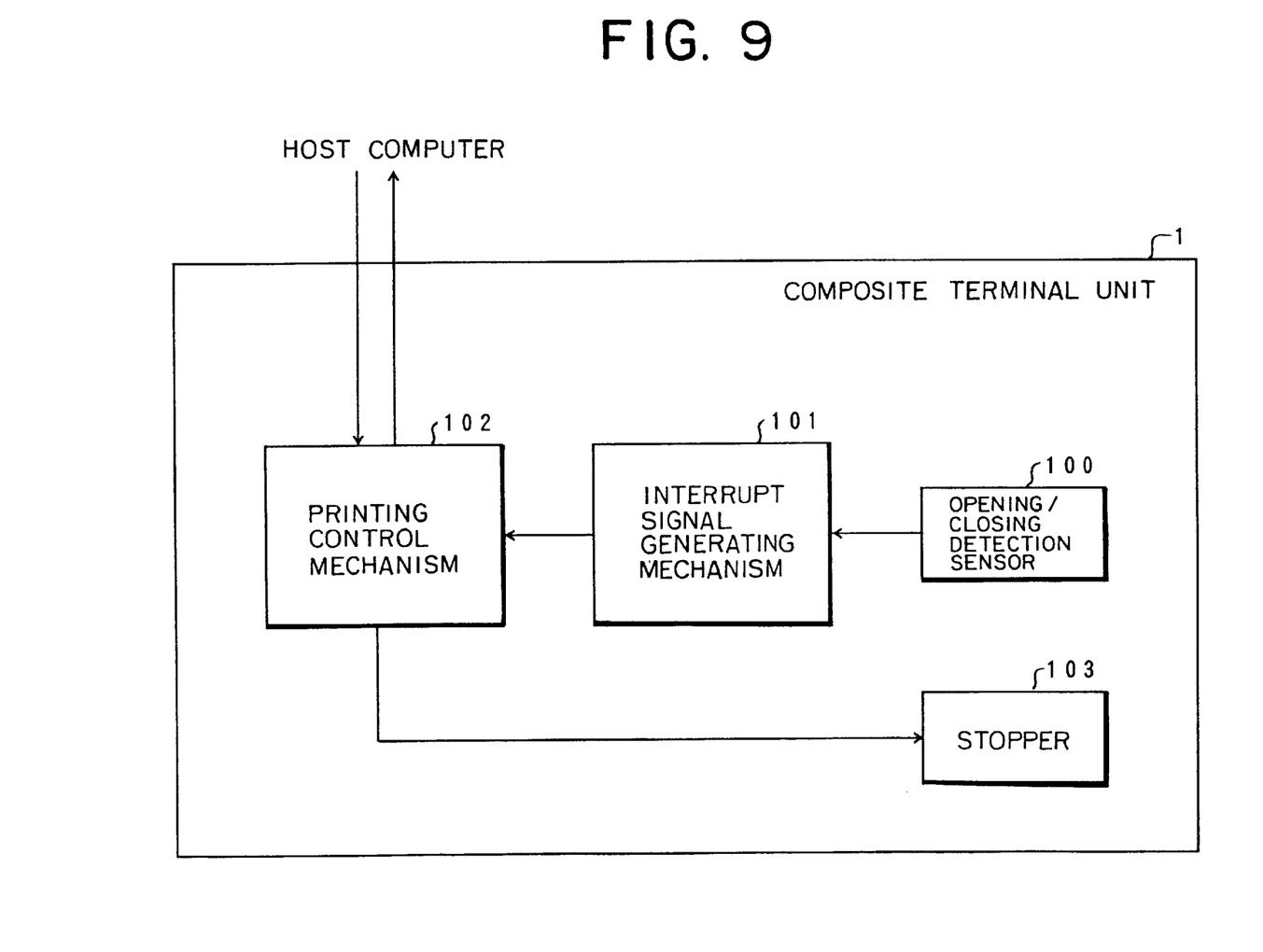
FIG. 9 is a diagram of assistance in explaining printing control processing.

More specifically, an opening/closing detecting sensor 100 for detecting the opening and closing of the base cover 5 is provided, as shown in FIG. 9, so that an interrupt signal generating mechanism 101 generates an interrupt signal as the opening/closing detecting sensor 100 detects that the base cover 5 is opened to inform the printing control mechanism 102 of the opening of the base cover 5. Upon receipt of the interrupt signal, the printing control mechanism 102 instructs a host computer (that issues a printing instruction, not shown) to instruct the printer to stop printing operation, or not to start printing so long as the base cover 5 is kept open.

In the composite terminal apparatus of the present invention, where the base cover 5 is opened to maintain the printer unit 2, an electromagnetically-operated stopper for preventing the base cover 5 from being opened is provided, so that the stopper prevents the base cover 5 from being opened while the printer unit 2 is in printing operation.

More specifically, an electromagnetically-operated stopper 103 for preventing the base cover 5 from being opened is provided, as shown in FIG. 9, so that the printing control mechanism 102 prevents the base cover 5 from being opened by controlling the stopper 103 so long as printing is being executed in accordance with an instruction given by a host computer (not shown).

An arrangement can be made where these control operations are executed only when the user sets that these control operations be executed, instead of carrying out these control operations unconditionally.

In the foregoing, the present invention has been described in accordance with the embodiments shown in the accompanying drawings, but the present invention is not limited to them. In the above embodiments, description has been made on a automatically running type scanner mounted on a printer, but the present invention can apply to scanners, other than the self-travelling type.

As described above, the apparatus of this invention of a type where a printing function is combined with a scanning function by mounting an scanner on a printer can improve maintainability since the scanner is detachably mounted on a front cover and the front cover on which the scanner is mounted can be opened upward in the direction of the back surface. This arrangement can reduce the space required for the front part of the printer, compared with the arrangement where the front cover is opened downward in the direction of the front side.

What is claimed is:

1. An apparatus comprising:

a base unit;

a scanner unit which can be removably mounted on said base unit;

a front cover provided on said base unit and being opened upward in the direction of the back surface of said base;

a scanner mounting member provided on said front cover and detachably fitting said scanner; and front cover mounting members, including a rotation fulcrum, provided on said base unit and detachably fitting said front cover, wherein said rotation fulcrum is disposed in such a location that the gravity center of said front cover is located on the rear surface side with respect to a vertical line passing on said rotation fulcrum.

2. An apparatus according to claim 1, wherein said front cover forms a transport path of medium discharged by said scanner unit.

3. An apparatus according to claim 1, wherein said scanner unit is detachably fitted to said scanner mounting member in such an attitude that main scanning direction becomes horizontal.

4. An apparatus according to claim 1, wherein said front cover is adapted to automatically open in accordance with the positional relationship between said rotation fulcrum and the gravity center of said front cover.

5. An apparatus according to claim 1, wherein said scanner mounting member includes pivotal shafts provided on either one of said base unit and scanner unit and holding and allowing said scanner unit to rotate, and grooves provided on the other one receiving and holding said pivotal shafts.

6. An apparatus according to claim 5, wherein said grooves are opened downward.

7. An apparatus according to claim 5, wherein said scanner mounting member includes locking pawls provided on either one of said base unit and scanner unit and holding and fixing said scanner unit, and locking pawl grooves provided on the other one and receiving and holding said locking pawls.

8. An apparatus according to claim 5, wherein said scanner mounting member includes shift stoppers provided on either one of said base unit and scanner unit and holding and fixing said scanner unit, and shift stopper grooves provided on the other one and receiving and holding said shift stoppers.

9. An apparatus according to claim 5, wherein said scanner mounting member includes rotation stoppers provided on either one of said base unit and scanner unit and holding and fixing said scanner unit, and rotation stopper grooves provided on the other one and receiving and holding said rotation stoppers.

10. An apparatus according to claim 1, further comprising:
    tray mounting members provided at a location higher than the location of said scanner mounting member; and
    a scanner tray member rotatably connected to said front cover at said tray mounting members and feeding medium to said scanner unit.

11. An apparatus according to claim 10, wherein said tray mounting members are rotation fulcrum.

12. An apparatus according to claim 11, further comprising:
    a printer tray member feeding medium to said printer unit, wherein said scanner tray member is in a position tilted at a smaller angle than the tilting angle of said printer tray member in a state that said front cover is closed.

13. An apparatus according to claim 11, wherein said scanner tray member is rotated forward around said rotation fulcrum by hitting a part of said front cover against said printer tray member which is located behind thereof at the time said front cover is opened, so that said front cover is to be opened.

14. An apparatus according to claim 11, wherein said rotation fulcrum is disposed with the gravity center of said scanner tray being situated on the rear surface side with respect to the vertical line passing on said rotation fulcrum, said scanner tray being rotated backward to be automatically returned to the original attitude in a case that said front cover is closed again.

15. An apparatus according to claim 14, wherein said tray member automatically returns to the normal position thereof in a case that said front cover is closed in accordance with the positional relationship between the rotation fulcrum and the gravity center of said tray member.

16. An apparatus according to claim 1, further comprising:
    holding and pushing members provided on said base unit; and
    a protruded member provided on the rear surface of said front cover and restricting the opening and closing of said front cover in a case that inserted between said members.

17. An apparatus according to claim 16, wherein a gap formed between said holding and pushing members is smaller than the thickness defined by the thickness of the internal wall of said base unit and the height of said protruded member.

18. An apparatus according to claim 16, wherein a taper is formed on said protruded member.

19. An apparatus according to claim 16, wherein said protruded member is adapted to fit in a space formed by said holding member in a state that said front cover is closed.

20. An apparatus according to claim 16, wherein said protruded member is adapted to avoid being inserted in a case that said front cover is returned to the normal position thereof.

21. An apparatus according to claim 1, wherein said base unit includes a printer unit.

22. An apparatus according to claim 21, further comprising:
    a sensor unit detecting the opening and closing of said front cover; and
    a printing control mechanism controlling said printer unit to stop a printing operation in a case that said sensor unit detects that said front cover is to be opened.

23. An apparatus according to claim 22, wherein said printing control mechanism determines whether control processing is executed in accordance with modes being set.

24. An apparatus according to claim 22, further comprising:
    an interrupt signal generating mechanism generating an interrupt signal as said sensor unit detects that said front cover is to be opened and informing the printing control mechanism of the opening of said front cover.

25. An apparatus according to claim 21, further comprising:
    a sensor unit detecting the opening and closing of said front cover; and
    a printing control mechanism controlling said printer unit to prevent said printer unit from starting a printing operation in a case that said sensor unit detects that said front cover has been opened.

26. An apparatus according to claim 25, wherein said printing control mechanism determines whether control processing is executed in accordance with modes being set.

27. An apparatus according to claim 25, further comprising:
    an interrupt signal generating mechanism generating an interrupt signal as said sensor unit detects that said front cover has been opened and informing the printing control mechanism of the opening of said front cover.

28. An apparatus according to claim 21, further comprising:
    a preventing mechanism preventing said front cover from being opened; and
    a printing control mechanism controlling said preventing mechanism to prevent said front cover from being opened.

29. An apparatus according to claim 28, wherein said printing control mechanism determines whether control processing is executed in accordance with modes being set.

30. An apparatus according to claim 28, wherein said preventing mechanism is an electromagnetically operated stopper controlled by said printing control mechanism.

31. An apparatus comprising:
    a base unit;
    a front cover provided on said base unit and being opened upward in the direction of the back surface of said base unit;
    a scanner mounting member provided on said front cover and detachably fitting a scanner unit which can be removably mounted on said base unit;
    holding and pushing members provided on said base unit; and
    a protruded member provided on the rear surface of said front cover and restricting the opening and closing of said front cover in a case that inserted between said members.

32. An apparatus according to claim 31 further comprising:
    tray mounting members provided at a location higher than the location of said scanner mounting member; and
    a scanner tray member rotatably connected to said front cover at said tray mounting members and feeding medium to said scanner unit.

33. An apparatus according to claim 32, further comprising:
    front cover mounting members, including a rotation fulcrum, provided on said base unit and detachably fitting said front cover, wherein said front cover is adapted to automatically open in accordance with the positional relationship between said rotation fulcrum and the gravity center of said front cover.

34. An apparatus according to claim 32, further comprising:
- a printer unit included in said base unit;
- a sensor unit detecting the opening and closing of said front cover; and
- a printing control mechanism controlling said printer unit to stop a printing operation in a case that said sensor unit detects that said front cover is to be opened.

35. An apparatus according to claim 32, further comprising:
- a printer unit included in said base unit;
- a sensor unit detecting the opening and closing of said front cover; and
- a printing control mechanism controlling said printer unit to prevent said printer unit from starting a printing operation in a case that said sensor unit detects that said front cover has been opened.

36. An apparatus according to claim 32, further comprising:
- a printer unit included in said base unit;
- a preventing mechanism preventing said front cover from being opened; and
- a printing control mechanism controlling said preventing mechanism to prevent said front cover from being opened.

* * * * *

UNITED STATES PATENT AND TRADEMARK OFFICE
CERTIFICATE OF CORRECTION

PATENT NO.    : 6,633,414 B1
DATED         : October 14, 2003
INVENTOR(S)   : Yasuhiro Matsuda et al.

It is certified that error appears in the above-identified patent and that said Letters Patent is hereby corrected as shown below:

Title page,
Item [56], References Cited, FOREIGN PATENT DOCUMENTS, change "10-38210 5/1998" to -- 10-139210  5/1998 --; add -- JP    10-150513    6/1998 --.

Column 10,
Line 63, change "32" to -- 31 --.

Signed and Sealed this

Eighth Day of June, 2004

JON W. DUDAS
*Acting Director of the United States Patent and Trademark Office*